Figure 19:
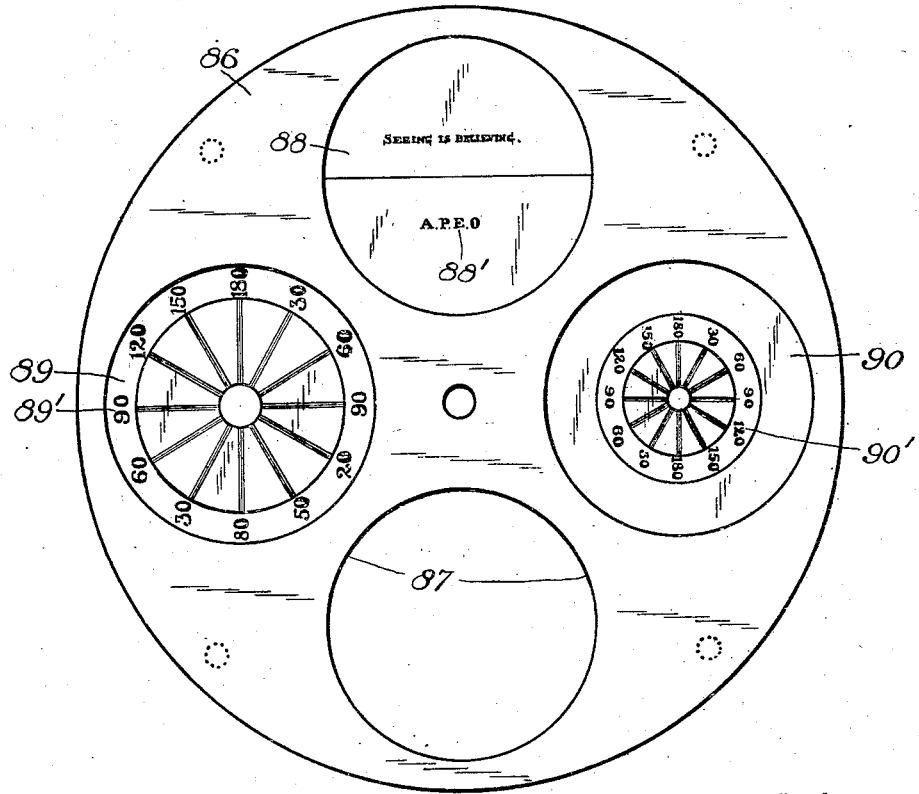

F. B. HUGHES.
OPTO-REFRACTOR METER.
APPLICATION FILED JULY 27, 1908.
929,134.
Patented July 27, 1909.
4 SHEETS—SHEET 1.
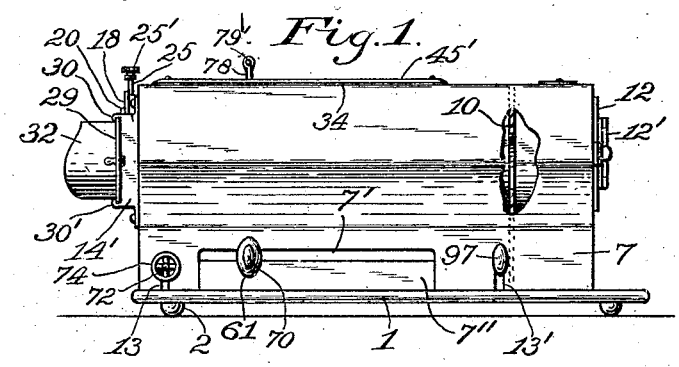
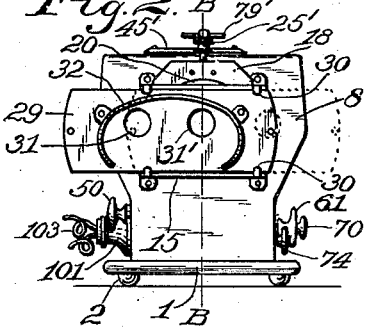
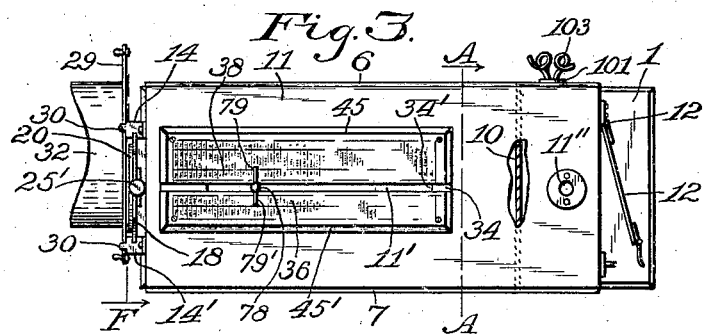
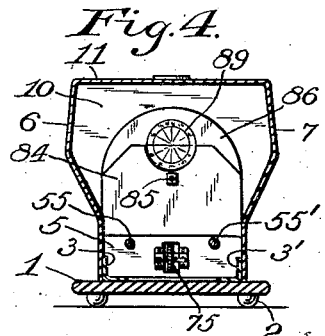
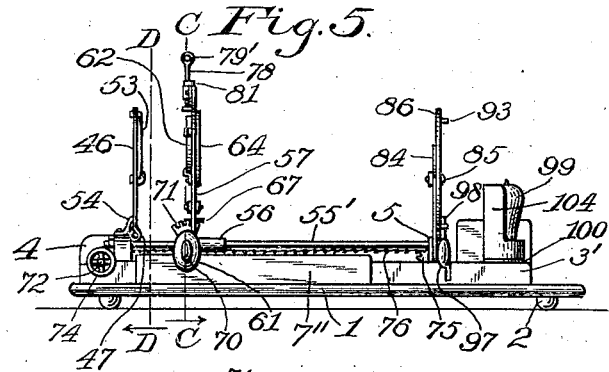
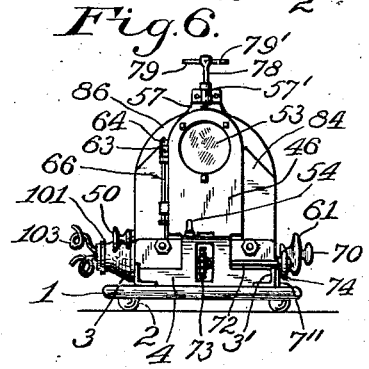
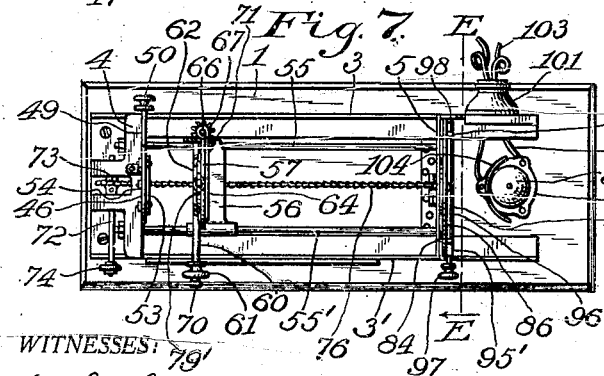
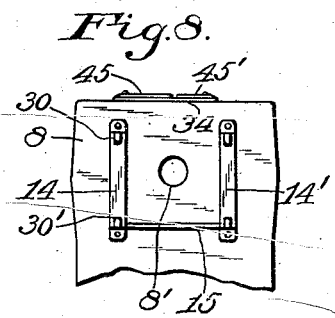
WITNESSES:
J. H. Gardner
K. R. Woddell
INVENTOR:
Frank B. Hughes,
BY
E. T. Silvius,
ATTORNEY.

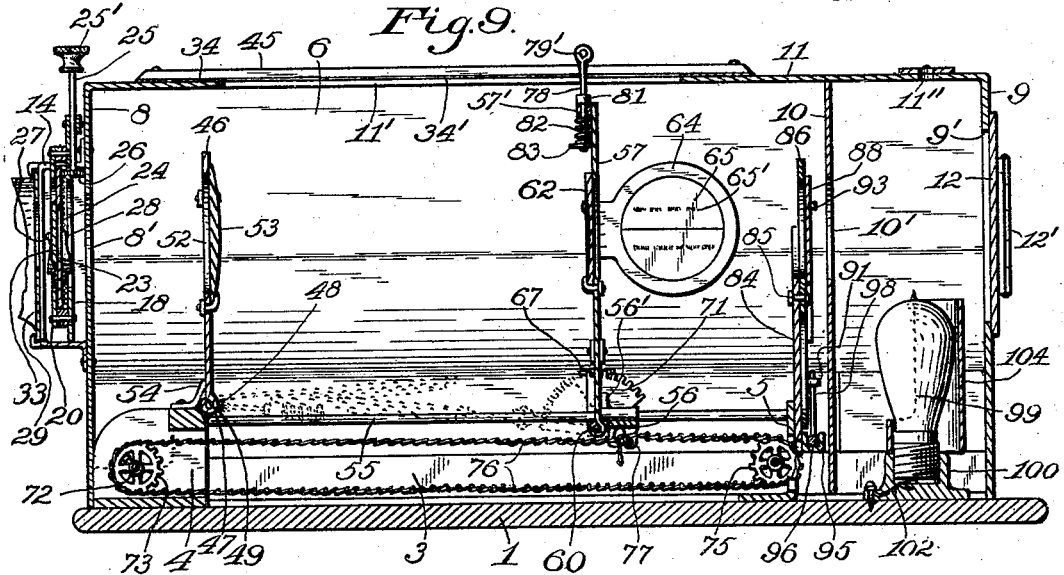
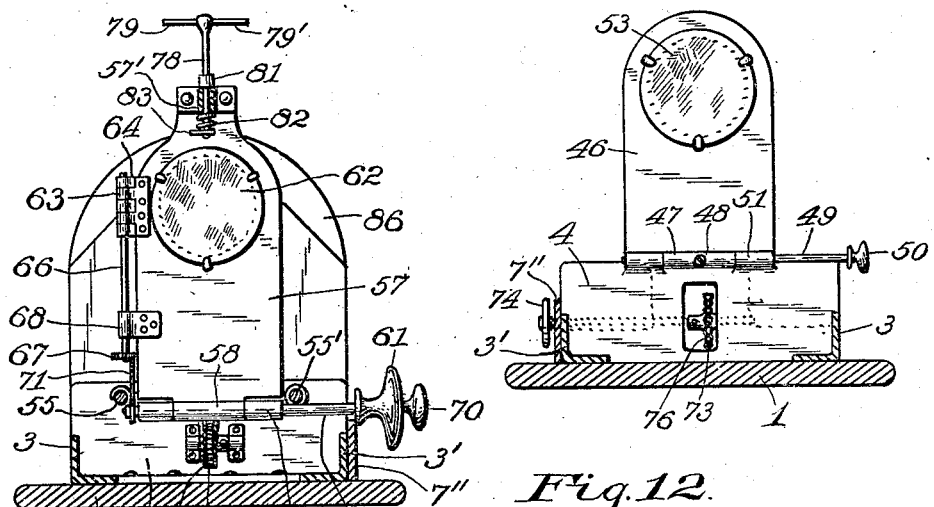
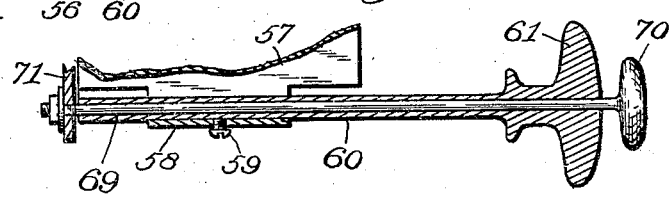

F. B. HUGHES.
OPTO-REFRACTOR METER.
APPLICATION FILED JULY 27, 1908.
929,134.
Patented July 27, 1909.
4 SHEETS—SHEET 3.
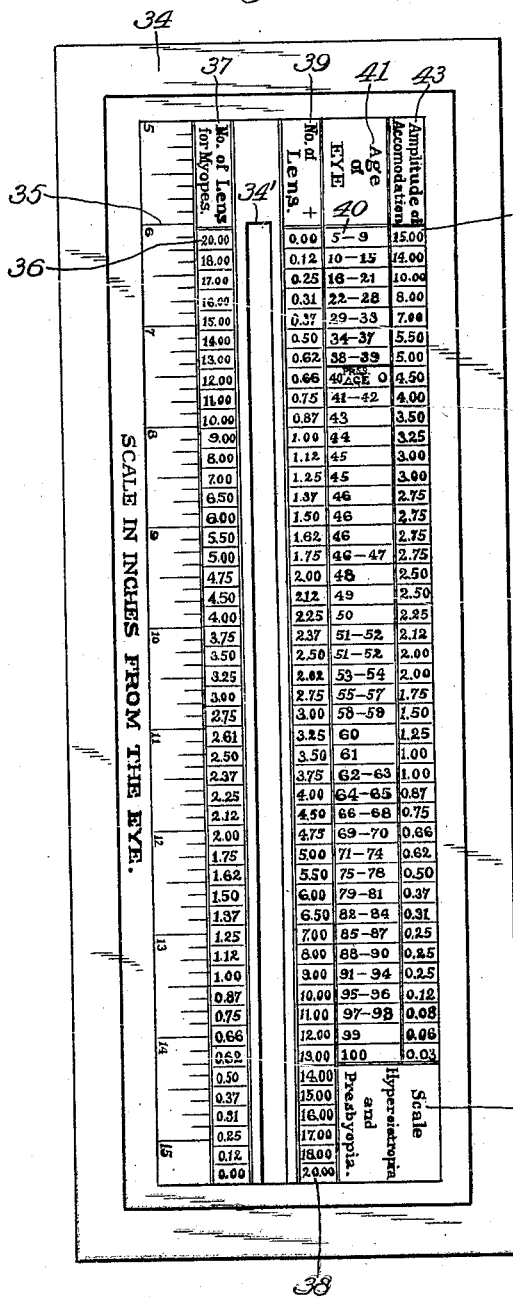
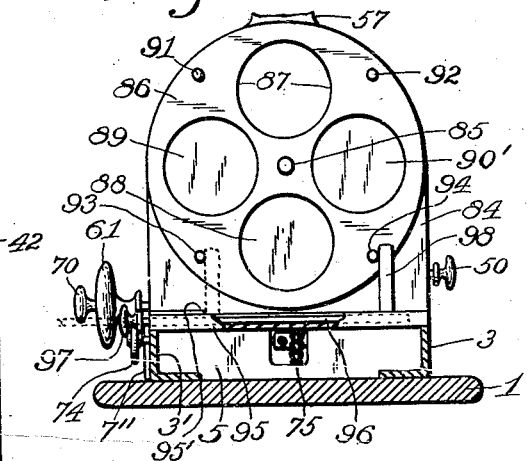
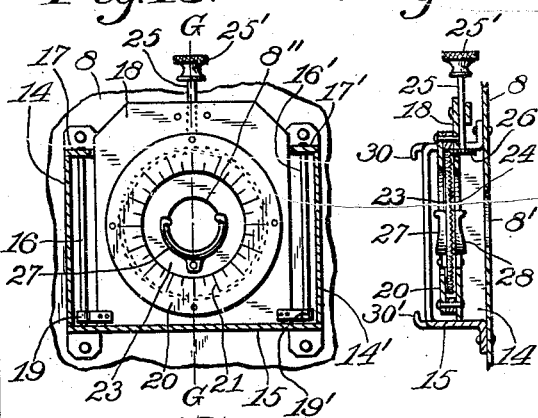
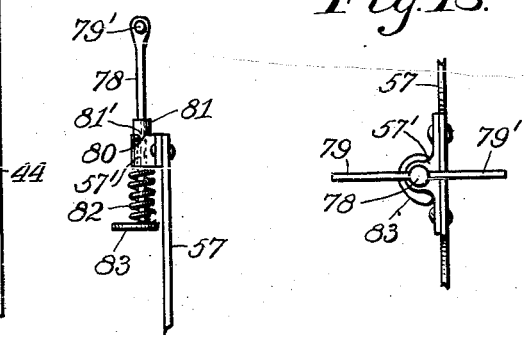
WITNESSES:
J. H. Gardner
K. R. Woddell.
INVENTOR:
Frank B. Hughes,
BY
E. T. Silvius,
ATTORNEY.

F. B. HUGHES.
OPTO-REFRACTOR METER.
APPLICATION FILED JULY 27, 1908.

929,134.

Patented July 27, 1909.
4 SHEETS—SHEET 4.

WITNESSES:
J. H. Gardner
H. R. Woddell

INVENTOR:
Frank B. Hughes,
BY
E. F. Silvius,
ATTORNEY.

UNITED STATES PATENT OFFICE.

FRANK B. HUGHES, OF INDIANAPOLIS, INDIANA.

OPTO-REFRACTOR METER.

No. 929,134.   Specification of Letters Patent.   Patented July 27, 1909.

Application filed July 27, 1908. Serial No. 445,468.

*To all whom it may concern:*

Be it known that I, FRANK B. HUGHES, a citizen of the United States, residing at Indianapolis, in the county of Marion and State of Indiana, have invented certain new and useful Improvements in Opto-Refractor Meters; and I do declare the following to be a full, clear, and exact description of the invention, reference being had to the accompanying drawings, and to the letters and figures of reference marked thereon, which form a part of this specification.

This invention relates to eye-testing and measuring instruments that are designed to be used by opticians and oculists, the invention having reference particularly to apparatus whereby the practitioner may readily examine and ascertain the nature or character of all ocular errors of refraction and defects of the human eye, and be enabled to determine the proper remedy therefor.

Objects of the invention are to provide improved eye-testing and measuring apparatus or a machine by which to eliminate uncertainties and inaccuracies common to methods of examination by trial frames and lenses, also to facilitate examinations by both the subjective and objective tests for all ocular errors of refraction without unduly tiring the patient; a further object being to provide means for promptly indicating to the optician by monocular tests the character and strength of eye-glasses that may be required by a patient under examination to correct defects of vision.

The invention consists in an opto-refractormeter comprising broadly a housing to afford a "dark-room" for objective tests and to exclude lateral light rays from the lenses of the apparatus when making subjective tests, a stationary or relatively-fixed lens and a movable or adjustable lens and a target and also a lamp mounted in the housing, the movable lens being movable along a perfect optical axis and mounted on a carrier that is provided with a pointer which is visible above the housing, a lens-holder mounted on the front of the housing and holding a lens removably, and a scale on the top of the housing to be read as indicated by the pointer for ascertaining lens numbers required; all necessary lenses of the apparatus being alined; the distance of one lens from another at a given point producing a lens whose focal length equals in strength the lens designated by the pointer by number on the scale on the housing. And, the invention consists specifically in the novel features of construction of the apparatus, and in the parts and combinations and arrangements of parts, as hereinafter particularly described and defined in the appended claims.

Figure 20:
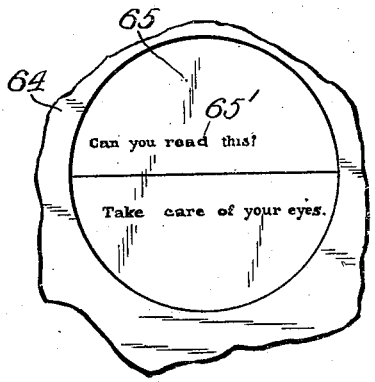
Figure 21:
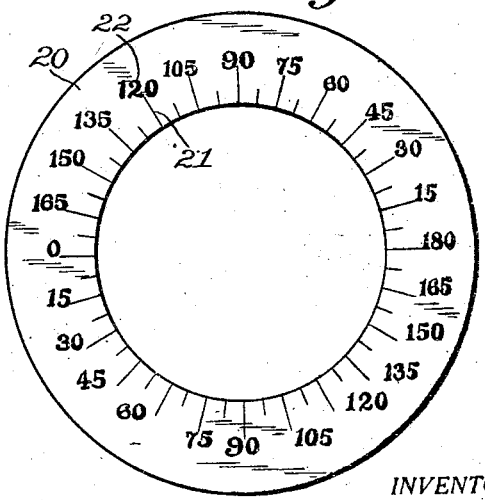

Referring to the drawings Figure 1 is a side elevation of the apparatus, a portion of the housing thereof being broken away; Fig. 2, an end elevation; Fig. 3, a top plan with a portion of the housing broken away; Fig. 4, a transverse sectional view on the line A—A in Fig. 3; Fig. 5, a side elevation of the apparatus without the housing; Fig. 6, an end elevation without the housing; Fig. 7, a top plan without the housing; Fig. 8, a fragmentary end elevation of the housing; Fig. 9, a longitudinal vertical central sectional view of the apparatus in which a portion of the eye shield is broken away; Fig. 10, a transverse sectional view on the line C—C in Fig. 5; Fig. 11, a transverse sectional view on the line D—D in Fig. 5; Fig. 12, a fragmentary sectional view approximately on the line C—C in Fig. 5 on an enlarged scale; Fig. 13, a plan view of the scale card and scales or tables thereon that is used on the top of the housing; Fig. 14, a transverse sectional view on the line E—E in Fig. 7; Fig. 15, a fragmentary vertical sectional view on the line F in Fig. 3; Fig. 16, a transverse sectional view on the line G—G in Fig. 15; Fig. 17, a fragmentary elevation of the movable lens carrier and pointer thereon; Fig. 18, a fragmentary top plan of the carrier and pointer; Fig. 19, a front elevation of the target holder and targets thereon; Fig. 20, a front elevation of the chart; and Fig. 21, a front elevation of the circular plate having degrees of the circle thereon which forms a part of the lens supporter on an end of the housing.

Similar reference characters throughout the drawings indicate corresponding elements or features of construction referred to herein.

The specific apparatus shown herein as illustrating the preferred construction of the invention comprises a base 1 preferably having rubber feet 2 and a main frame mounted on the base, a part of the frame constituting a housing covering some of the operative parts as will further become apparent. While the apparatus may be constructed in various sizes it is preferable that it be of convenient dimensions so as to be portable and not occupy unnecessary space and also so as to be convenient in use, a suitable length being about twenty inches, more or less. The frame comprises preferably a pair of side sills 3 and 3′ and end sills 4 and 5, all secured suitably to the base 1 and preferably connected together. The housing has two sides 6 and 7 and two ends 8 and 9 connected together, and a partition connected to the sides and having a circular aperture 10′ therein, the partition being arranged somewhat near to the end 9, a top 11 being connected to the sides and ends and also to the partition, the housing being mounted removably on the base 1 and extending about the frame members that are secured to the base. The housing preferably is formed of sheet metal and covered with black enamel or paint on the interior thereof. The top 11 has a longitudinal slot 11′ therein and has also an aperture 11″ therein near the end 9 for the escape of heat from a lamp which may be used in the housing. The end 9 has an aperture or doorway 9′ therein that is normally covered by a door 12 that is connected by a hinge 12′ to the end. The side 7 of the housing has a recess 7′ in the lower portion thereof, and the sill 3′ has a filling piece 7″ thereon that is of the same length but slightly less height than the recess, leaving a clearance space between the top of the filling piece and the lower edge of the side 7 in the recess 7′, said side 7 having also two slots 13 and 13′ in the lower part thereof. The end 8 has an aperture 8′ therein that is circular and arranged opposite to the aperture 10′ in the partition 10, the door-way 9′ being opposite to the aperture 10′ so that either a patient or a practitioner may look through the housing.

It is designed that the housing shall support one or more lenses removably and also an eye shield and head rest for the patient, and for this purpose two guide members 14 and 14′ are secured to the end 8 of the housing and have a stop plate 15 connected thereto, there being two guide rods 16 and 16′ arranged vertically and attached to flanges 17 and 17′ of the guide members, a lens supporter 18 being guided by the flanges and having also a pair of guide blocks 19 and 19′ attached thereto and engaging the rods 16 and 16′, the supporter normally resting on the plate 15 and movable vertically. The supporter 18 has an aperture 8″ therein opposite to the aperture 8′, and an annular plate 20 is attached to the outer side or front of the supporter so as to extend about the aperture, the front of the plate having graduations 21 thereon and numerals 22 indicating degrees of the circle. An annular lens holder 23 is suitably guided rotatively between the supporter 18 and the plate 20 and has gear teeth 24 arranged in a circle thereon. A spindle 25 is rotatively mounted on the supporter 18 and has a hand-wheel 25′ attached thereto and also a pinion 26 secured to the spindle and engaging the gear teeth 24 whereby the holder may be rotated, the holder having a lens receptacle 27 mounted thereon so that a lens when inserted in a receptacle may be turned rotatively by means of the wheel 25′. A lens receptacle 28 is mounted on the supporter 18 and will hold the lens in stationary position opposite the aperture 8′ and between the aperture and the lens that may be placed in the receptacle 27. A plate 29 is mounted in guides 30 and 30′ with which the members 14 and 14′ are provided and has two circular apertures 31 and 31′ therein and is also provided with a shield 32 on the outer side thereof against which the patient may steady his head while looking into the housing, the plate 29 being movable so that either aperture therein may be brought opposite to the lens 33 in the receptacle 27 and consequently opposite to the aperture 8′ so that either eye of the patient may be tested separately.

On the upper side of the top 11 of the housing is a scale card 34 having a slot 34′ therein registering with the slot 11′ and may suitably be composed of paper with the desired printing thereon and glued or otherwise secured to the top 11. On one portion of the scale card is a scale 35 denoting inches from the eye of the patient and at one side of the slot 34′ is a scale 36 showing numbers indicating the character of lenses for eye glasses, the scale having a heading 37 designating that the numbers of lens are for "myopes." At the opposite side of the slot is a scale 38 having numbers of lenses arranged in reverse order to that of the scale 36 and having a heading 39 at one end thereof. Also a table 40 is arranged on the scale card and has a heading 41 denoting age of eye, and adjacent to this table is a table 42 having a heading 43 denoting "amplitude of accommodation". Adjacent to the scale 38 is a heading 44 therefor denoting scale hyperoietropia and presbyopia". Two glass plates 45 and 45′ are arranged on the top of the scale card and are suitably secured to the top of the housing.

A lens frame 46 has a hinge member 47 formed thereon that is secured by a set screw 48 to a rotative shaft 49 provided with a handle 50, the shaft being mounted in bearings 51 with which the end sill 4 is provided, the shaft extending through a suitable slot (not shown) in the side 6 of the housing. A convex lens 53 is suitably mounted on the frame 46 so as to be normally stationary, but as will be seen the frame 46 may be moved on its hinge so as to lie approximately horizontal, thus causing the lens to disappear from view, the lens when in use being constantly opposite to the opening 8′ and at a suitable predetermined distance from the end 8, the frame 46 normally standing against a stop 54 that is mounted on the end sill 4 so that the frame will be practically stationary when in operative position and be vertical. A pair of guide bars 55 and 55' are mounted on the end sills 4 and 5 so as to be horizontal, and a cross head 56 is mounted slidingly on the guide bars and provided with a stop 56' on the top thereof, the cross head forming a part of a carrier for the movable or adjustable lens, the carrier comprising also a frame 57 that has a hinge member 58 formed thereon which is secured by a set screw 59 to a hollow shaft 60 provided with a handle 61 and mounted rotatively on the cross head 56 in suitable bearings, a concave lens 62 being suitably mounted on the frame 57 so as to be movable between the lens 53 and the aperture 10' that is in the partition 10. The shaft 60 extends out in the space above the filling piece 7' and may be used for moving the carrier toward or from the lens 53, and by turning the handle 61 the lens 62 may be caused to disappear out of range by moving the frame 57 down to an approximate horizontal position as indicated by dotted lines in Fig. 9. A hinge member 63 is attached to the frame 57 and has a frame 64 hinged thereto, and a transparent chart 65 is mounted on the frame and has suitable words 65' thereon of suitable size for the purpose, the chart being normally supported by the frame opposite to the lens 62, or the frame may swing away so as to cause the chart to disappear from view. For operating the frame a shaft 66 is used as a hinge-pin for connecting the frame 64 to the hinge member 63 and is suitably secured to the frame, being rotative in the hinge member and has a pinion 67 secured thereto, the shaft being journaled in a bearing 68 that is attached to the frame 57. A shaft 69 is rotatively mounted in the hollow shaft 60 and is provided with a handle 70 on the outer end thereof, and on its inner end has a gear segment 71 secured thereto which is in engagement with the pinion 67, so that the frame 64 may be moved by turning the handle 70.

A shaft 72 is mounted rotatively in suitable bearings on the end sill 4 and has a sprocket wheel 73 secured thereto, the shaft extending out through the slot 13 and having a hand-wheel 74 secured to the outer end thereof for turning the shaft. A sprocket wheel 75 is suitably mounted rotatively on the sill 5, and a sprocket chain 76 is connected with the two sprocket wheels 73 and 75 and also attached to a lug 77 with which the cross head 56 is provided in order to adjust the position of the lens 62 with accuracy or to move it as it may be desired. In some cases, however, this gearing may be omitted and the cross head may be moved and adjusted solely by means of the handle 61.

A stem 78 is mounted in a bearing 57' with which the upper end of the frame 57 is provided and is adjustable rotatively, the top of the stem having two pointers 79 and 79' thereon, and when the pointers are properly adjusted the stem may be moved through the slot 11' in the cover of the housing, the stem normally standing upright with the pointer extending transversely of the slot so as to point to the scales at the side of the slot. The bearing 57' has notch 80 in the top thereof, and the stem 79 has a collar 81 thereon provided with a projection 81' that normally extends into the notch for holding the pointers in normal positions, a spring 82 being arranged on the lower end of the stem and seated against an arm 83 that is attached to the stem for limiting the rotative movement of the stem when turned so as to permit the housing to be removed, the spring being seated also against the bearing 57'.

A target frame 84 is suitably supported on the frame sill 5 and has a pivot 85 on which a target holder 86 is rotatively mounted, the holder having a circular aperture 87 therein and other suitable apertures at one of which a target 88 is mounted and having letters 88' thereon of suitable size proportionate to the dimensions of the apparatus, another target 89 having suitable characters 89' thereon and still another target 90 having suitable characters 90' thereon, the target 90 being preferably black along its marginal portion, and the front surface of the holder 86 is preferably black, the targets being transparent. The back of the wheel 86 is provided with four projections 91, 92, 93, 94, for its operation. A horizontal guide 95 is mounted on the frame sills and has a pull-rod 96 mounted slidingly therein and so as to move rotatively also, the pull-rod extending through the slot 13' in the housing side 7 and having a handle 97 on its outer end, the inner end of the pull-rod having an arm 98 thereon adapted to be moved into engagement with the projections on the back of the target holder to move the holder rotatively, for the purpose of changing the targets, the arm being designed to engage a stop 95' after having changed the positions of the targets. When retracting the pull-rod it is rotated slightly so as to permit the arm 98 to pass by the end of the projection that is to be next engaged by the arm, and then the pull-rod should be moved rotatively to cause the arm to engage the projection.

An incandescent electric lamp 99 is mounted in a socket 100 which is mounted on the base 1 between the end 9 and the partition 10, the frame having a coupler 101 mounted thereon which is connected by a circuit wire 102 with the lamp, the coupler being adapted to have a feed-wire 103 connected thereto or disconnected therefrom for conducting a current from any suitable source of electricity. The lamp bulb or globe is preferably frosted or ground to soften the light therefrom. A reflector 104 is mounted rotatively on the socket 100 so as to be adjustable to reflect the light either toward the aperture 10', or in the opposite direction toward the aperture 9', or through the latter aperture when the door 12 is open when the practitioner examines the eyes of the patient.

It should be understood that many and various modifications may be made in the details of construction of the apparatus within the scope of the invention, and it will be understood that various kinds of lenses may be used in the receptacles 27 and 28 and that two lenses may be used therein for mixed astigmatism. In the receptacle 27 a cylindrical lens or sphere will be suitable in some cases and in some cases a concave lens will be suitable in the receptacle 28. The lens supporter 18 is to be elevated to receive the lenses conveniently when changes of lenses are required, the receptacle 28 being stationary and the receptacle 27 revoluble within the stationary circle or graduated scale showing degrees of circle, so as to be able to determine the axis of a cylindrical lens when testing for astigmatism. When it is desired to move the lens 53 out of the range of vision the handle 50 will be turned so as to move the frame 52 down onto the guide bars 55 and 55'. When it is desired that the patient shall not see the chart 65 the handle 70 may be turned so as to swing it aside. The frame 57 normally stands against the stop 56' and is held upright by reason of the natural friction of the hollow shaft 60 in its bearings and also partially by being over-balanced by the weight of the frame 64. When it is desired to move the lens 62 out of the range of vision the stem 78 should first be turned one quarter turn until stopped by the arm 83, after which the handle 61 may be turned to move the frame 57 downward.

In practical use, one or two lenses are placed on the supporter 18, as may be required. In testing for hypermetropia and presbyopia the concave lens is removed from the lens receptacle 27 and the lens 62 is then moved from the eye of the patient, chart 65 being withdrawn from view and target 88 exposed, and at the distance from the eye at which the chart can best be seen, the number of lens required for the patient is designated and read on the scale 38 as indicated by the pointer 79. This measurement represents the manifest trouble. To find the latent trouble, chart 65 is moved into view and the lens 62 is then moved from the eye until the patient is able to read the chart, or words 65' thereon, with comfort and ease, the pointer 79 then indicating the number of lens to be used by the patient for near work. For myopia the proper lens is placed in receptacle 28 (receptacle 27 being vacant). This reverses the scale, and lens 62 is moved from the eye until pointer 79' covers 0.000 on scale 36 designated for "myopes"; lens 62 with chart 65 swung aside is then moved toward the eye until patient sees target 88 clearly and with ease. The strength of lens is then indicated by the pointer 79' on the scale 36. For hyperopic astigmatism target 89 is moved into view before the eye with a clear view through lenses 53 and 62 until some line on the target shows plainly; such line will show the axis of astigmatism, and a cylinder placed in receptacle 27 of the strength designated on chart and turned to axis indicated by patient will correct error, and the target will appear as to any normal eye, all radiating lines being distinctly seen. The same process is to be followed for myopic astigmatism with the exception that the proper lens is to be inserted in receptacle 28 (receptacle 27 being vacant) as for myopia.

Target 90 is used in connection with a double prism revolved by receptacle 27.

Having thus described the invention what is claimed as new, is—

1. An opto-refractormeter including a frame base, a housing on the base, a lens-supporter mounted on the housing, a relatively-fixed lens within the housing, a target within the housing, a chart supported adjustably within the housing, and an adjustable and disappearing lens within the housing.

2. An opto-refractormeter including a frame base, an inclosing housing on the base and having a lens-supporter on one end and a door on the opposite end thereof, a relatively-fixed lens within the housing, a target within the housing, an adjustable and disappearing lens frame supported within the housing and having a lens thereon, and a chart mounted on the adjustable and disappearing lens-frame to disappear therewith.

3. An opto-refractormeter including a frame base, a housing on the base and having a lens-supporter on one end and a door on the opposite end thereof, a relatively-fixed lens and an adjustable disappearing lens mounted on the base within the housing, a chart mounted movably within the housing to disappear simultaneously with the disappearance of the adjustable and disappearing lens, a target mounted within the housing, and an apertured partition in the housing between the target and the door.

4. An opto-refractormeter including a base, a housing mounted on the base and having a lens-supporter on one end and a door on the opposite end thereof, a plate mounted adjustably on the housing adjacent the lens-supporter and having two apertures therein, a relatively-fixed lens and an adjustable lens mounted on the base within the housing, a chart mounted movably within the housing, a plurality of targets mounted adjustably within the housing, and an apertured partition in the housing between the targets and the door.

5. An opto-refractormeter including a frame base, an inclosing housing on the base having a lens-supporter on one end thereof, the opposite end of the housing being apertured, a target-frame mounted on the base near the apertured end of the housing, a target-holder pivoted to the target-frame and having an aperture therein, targets mounted on the target-holder, a lens-frame hinged on the base and supporting a lens, a guide on the base, a crosshead movable on the guide, a lens-frame mounted on the crosshead and supporting a lens, and a chart mounted movably within the housing.

6. An opto-refractormeter including a frame base, a pair of guide-bars mounted fixedly on the base, a lens-frame hinged on the base and supporting a lens, a crosshead mounted movably on the guide-bars and having a shaft mounted rotatively thereon, a lens-frame secured to the shaft and supporting a lens, a chart-frame hinged to the lens-frame that is secured to said shaft, a chart on the chart-frame, a target-frame mounted on the base, a target-holder pivoted to the target-frame, targets mounted on the target-holder, a housing mounted removably on the base, and a lens-supporter mounted on the housing.

7. An opto-refractormeter including a frame base, a lens-frame pivoted on the base and supporting a lens, a plurality of targets mounted adjustably on the base, a housing mounted on the base and having a lens-supporter mounted movably on one end thereof provided with a lens-receptacle and also a rotative lens-holder adjacent the lens-receptacle, the lens-holder having a lens-receptacle thereon, a lens-frame pivoted to the base and supporting a lens, a guide mounted fixedly on the base, a crosshead movable on the guide, a shaft journaled on the crosshead, a lens-frame secured to the shaft and supporting a lens, and a chart mounted movably on the lens-frame that is secured to said shaft.

8. An opto-refractormeter including a stationary frame having a pair of guide-bars secured thereon, a lens-frame hinged to the stationary frame and having a lens thereon, a crosshead mounted movably on the guide bars and having a lens-frame hinged thereto that has a lens thereon, a plurality of adjustable targets mounted on the stationary frame, a housing connected with the stationary frame and having a lens-supporter thereon, and a chart mounted movably within the housing.

9. An opto-refractormeter including a stationary frame, a housing comprising a frame mounted on the stationary frame and having an apertured partition therein, one end of the housing having a door thereon opposite to the partition, a lens-supporter mounted on the opposite end of the housing on the opposite side of the partition, a relatively-fixed lens mounted within the housing, a movable lens mounted within the housing, a scale mounted on the housing, a pointer movable with the movable lens along the scale, a chart mounted movably within the housing, a target mounted within the housing, and a lamp mounted within the housing between the partition and the door.

10. An opto-refractormeter including a stationary frame base, an inclosing housing having a slot in its top and mounted on the base, a scale on the housing top adjacent the slot, a lens-supporter mounted on one end of the housing, a target mounted on the base in the opposite end of the housing, a lens-frame hinged on the base and having a lens thereon, a guide mounted fixedly on the base, a crosshead movable on the guide, a lens-frame hinged on the crosshead and having a lens fixed thereon, and also a shaft mounted rotatively thereon, stops for the shaft, a pointer on the shaft to be moved thereby toward the scale, the shaft being movable into or out of the slot in the housing, and a chart mounted movably in the housing.

11. An opto-refractormeter including a frame base, a housing mounted on the base, a target mounted on the base within the housing, guide-members mounted on the outer side of one of the ends of the housing, a lens-supporter mounted slidingly on the guide-members, a lens-receptacle mounted on the lens-supporter, a lens-holder mounted rotatively on the lens-supporter, a lens-receptacle mounted on the lens-holder, two lens-frames mounted on hinges in the housing and having lenses thereon, one of the lens-frames being adjustable toward or from the other one, and a chart mounted movably within the housing.

12. The combination of a stationary frame, a lens mounted on the stationary frame, a pair of guide-bars mounted on the stationary frame, a crosshead mounted on the guide-bars and having a hollow shaft mounted rotatively thereon, a lens-frame attached to the hollow shaft and having a hinge-member thereon, a lens mounted on the lens-frame, a chart-frame hinged to the hinge-member and having a shaft attached thereto that is rotative in the hinge-member and provided with a pinion, a chart mounted on the chart-frame, a spindle rotative in the hollow shaft and having a toothed segment thereon that is in engagement with the pinion, and a target mounted on the stationary frame, with a housing in connection with the stationary frame, and a lens-supporter mounted on the housing.

13. The combination of a stationary frame, a housing mounted in connection with the stationary frame and having a door thereon normally covering an aperture in the housing, a target-frame mounted on the stationary frame opposite to the door, a guide mounted adjacent to the target-frame, a target holder pivoted to the target-frame and having a plurality of projections thereon, targets mounted on the target-holder, a pull-rod mounted movably on the guide and having an arm thereon to engage the projections, a relatively fixed lens mounted within the housing, a movable lens mounted on the stationary frame, and a chart mounted movably within the housing, with a lens-supporter mounted movably opposite to the relatively-fixed lens.

14. The combination of a stationary frame, a pair of guide-bars mounted fixedly on the stationary frame, a shaft mounted rotatively on the stationary frame, a drive wheel secured to the shaft, a guide-wheel mounted rotatively on the stationary frame, a crosshead mounted movably on the guide-bars, a drive-belt connected to the crosshead and also with the drive-wheel and the guide-wheel, a lens-frame mounted on the crosshead and having a chart-frame mounted thereon, a lens on the lens-frame, a chart on the chart-frame, and a housing connected with the stationary frame, with a relatively-fixed lens and a target mounted within the housing, and a lens-supporter mounted adjacent to the relatively-fixed lens.

15. In an opto-refractormeter, the combination of a base, an inclosing housing on the base having apertures in opposite ends thereof, a partition in the housing near one of said ends and having an aperture therein, a lamp mounted between the partition and said one of the ends, a reflector mounted to be movable about the lamp, a target-frame mounted adjacent to the partition, targets mounted adjustably on the target-frame, a lens mounted in the housing in proximity to the opposite one of the apertured ends thereof, a lens-supporter mounted adjacent to said opposite end of the housing, a lens mounted adjustably in the housing, and a chart mounted adjustably in the housing.

In testimony whereof, I affix my signature in presence of two witnesses.

FRANK B. HUGHES.

Witnesses:
 MABEL B. HUGHES,
 WILLIAM D. ECKENRODE.